United States Patent [19]

Clawson

[11] Patent Number: 4,726,353
[45] Date of Patent: Feb. 23, 1988

[54] HIGH CONDENSING RECUPERATIVE FURNACE

[75] Inventor: Lawrence G. Clawson, Dover, Mass.

[73] Assignee: Raytheon Company, Lexington, Mass.

[21] Appl. No.: 28,837

[22] Filed: Mar. 23, 1987

Related U.S. Application Data

[60] Division of Ser. No. 900,260, Aug. 25, 1986, Pat. No. 4,681,085, which is a continuation of Ser. No. 761,636, Aug., 1985, abandoned.

[51] Int. Cl.⁴ .............................................. F24H 1/00
[52] U.S. Cl. .............................. 126/350 R; 126/361; 261/151; 261/153
[58] Field of Search ............... 126/116 R, 350 R, 361, 126/362, 363; 122/7 R; 165/DIG. 905, DIG. 913; 261/119.1, 151, 153

[56] References Cited

U.S. PATENT DOCUMENTS

| | | | |
|---|---|---|---|
| 1,961,231 | 6/1934 | Maier | 122/17 |
| 2,533,692 | 12/1950 | Rice | 126/101 |
| 3,489,209 | 12/1968 | Johnson | 165/133 |
| 3,724,537 | 3/1973 | Johnson | 165/133 |
| 3,926,173 | 12/1975 | Jury | 126/99 R |
| 4,069,807 | 1/1978 | Hartig | 126/110 R |
| 4,375,950 | 3/1983 | Durley, III | 431/76 |
| 4,393,815 | 7/1983 | Pedersen et al. | 122/31 R |
| 4,436,059 | 3/1984 | Galati | 122/17 |
| 4,478,158 | 10/1984 | Smith | 110/215 |
| 4,478,206 | 10/1984 | Ahn | 126/99 A |
| 4,491,093 | 1/1985 | Hoekstra | 122/420 |
| 4,557,202 | 12/1985 | Warner | 165/905 |
| 4,605,059 | 8/1986 | Page | 165/163 |

FOREIGN PATENT DOCUMENTS 3222069 12/1983 Fed. Rep. of Germany ...... 165/913
2031572 4/1980 United Kingdom .

Primary Examiner—Samuel Scott
Assistant Examiner—Noah Kamen
Attorney, Agent, or Firm—William R. Clark; Richard M. Sharkansky

[57] ABSTRACT

A forced hot air furnace having a continuously wet recuperative heat exchanger. The recuperative heat exchanger is positioned in the hot air chamber at an upward incline from the firebox to the outside flue. Inclined positioning enables heat exchanger condensate to drain counter to combustion products. Condensate is collected in a reservoir located in the firebox. Combustion products flow over the reservoir thereby becoming elevated in dew point before entering the heat exchanger. Consequently, the amount of condensation formed in the heat exchanger is substantially increased over conventional heat exchangers. Condensate will form along the entire length of the heat exchanger resulting in all wet operation. In another embodiment, continuously wet operation is achieved without a water reservoir. In still another embodiment, the continuously wet recuperative heat exchanger is coupled to the output of a non-recuperative heat exchanger. In an alternate embodiment, a continuously wet recuperative heat exchanger is utilized to heat a liquid.

1 Claim, 11 Drawing Figures

HIGH CONDENSING RECUPERATIVE FURNACE

CROSS-REFERENCE TO RELATED APPLICATIONS

This is a division of application Ser. No. 900,260, filed Aug. 25, 1986, (now U.S. Pat. No. 4,681,085) which is a continuation of application Ser. No. 761,636, filed Aug. 1, 1985 (now abandoned).

BACKGROUND OF THE INVENTION

The field of the invention relates to recuperative or condensing furnaces. Generally, they are furnaces which transfer both sensible heat and heat of condensation from combustion products.

Nonrecuperative furnaces only transfer sensible heat from combustion products as they are cooled. Condensation does not occur during the heating cycle since combustion products are exhausted at a temperature above their dew point. Heat transfer by nonrecuperative furnaces is, therefore, commonly referred to as a dry process.

On the other hand, recuperative furnaces not only transfer heat by the dry process of nonrecuperative furnaces but also simultaneously transfer heat of condensation. A separate recuperative heat exchanger is commonly used to transfer additional heat from combustion products after they have passed through a dry process. The recuperative heat exchanger cools combustion products sufficiently to condense thereby transferring both condensate heat and sensible heat. The additional heat transfer by the recuperative heat exchanger increases overall furnace efficiency to approximately 95%. Whereas, nonrecuperative furnaces are limited to 85% efficiency.

Besides providing high efficiencies, the lower exhaust temperatures of recuperative furnaces enable the use of inexpensive exhaust venting such as, for example, pvc pipe rather than conventional chimneys. Further, low exhaust temperatures eliminate the draft hood associated with non-recuperative furnaces wherein heat is lost during the cool-down period at the end of each heating cycle.

Recuperative furnaces, however, are subject to corrosive attack of the recuperative heat exchanger by acidic condensate formed therein. In combusting natural gas, and to a greater extent fuel oil, a number of potentially acid forcing gases are produced. Although these gases are typically noncondensable at the operating temperatures of the recuperative heat exchanger, they are absorbed by water vapor condensate thereby forming acids. For example, carbon dioxide forms carbonic acid, nitrogen dioxide forms nitric acid, hydrogen chloride forms hydrochloric acid, and hydrogen fluoride forms hydrofluoric acid. In addition, sulphur dioxide will condense within a recuperative heat exchanger thereby forming sulphurous acid. The acidity of the condensate is further increased when water condensate evaporates leaving behind concentrated acids which corrosively attack the heat exchanger.

Corrosive attack may also occur on heat exchange surface areas which are only exposed to combustion products that are above their dew point temperature. At the beginning of the heating cycle, incipient condensation may briefly form on initially cool surface areas. As these surfaces become heated during the heating cycle, the condensation evaporates and does not reoccur. Localized corrosion may therefore occur on these surfaces.

Several prior art approaches attempted to prevent corrosive attack. First, stainless steel components were used. However, it was found that chlorides are often present in our environment at levels which produce sufficient hydrochloric acid to corrode stainless steel. For example, chlorides are commonly found in laundry room areas which are often in close proximity to residential furnaces.

Second, hydrochloric acid resistant materials were proposed. A stainless steel molybedum alloy may be effective but is prohibitively expensive for residential heat exchangers. Although polymer or ceramic coatings may also be effective, they would increase thermal resistance and may also be subject to thermal shock. See U.S. Dept. of Energy, BNL51770, Condensing Heat Exchanger Systems for Residential/Commercial Furnaces and Boilers, Phase III, February 1984.

Third, U.S. Pat. No. 4,449,511 shows an external water flush system which is activated after each heating cycle to flush condensate from the coupling between the recuperator and burner. A potential corrosive problem may still exist in high chloride environments for corrosive attack on areas not flushed.

SUMMARY OF THE INVENTION

The primary object of the invention is to provide a high efficiency furnace having a recuperative heat exchanger wherein corrosive attack by acidic combustion product condensate is substantially lessened.

Another object of the invention is to provide a recuperative heat exchanger wherein water vapor condensate continuously flushes away acidic condensate from the heat exchanger.

Another object of the invention is to elevate the dew point of combustion products above their natural dew point by mixing water vapor with the combustion products. The formation of water condensate in the recuperative heat exchanger is thereby increased.

Another object of the invention is to eliminate transition areas in the recuperative heat exchanger between dry and wet surface areas. These areas are particularly prone to corrosion since the acid concentration of condensate increases as condensate water evaporates.

Another object of the invention is to reduce corrosion by eliminating heat transfer surface areas which dry out during the heating cycle. Stated differently, an object of the invention is to eliminate initially cool heat transfer surface areas which collect incipient condensate and then dry out later in the heating cycle.

Another object of the invention is to allow only non-heat transfer surfaces to dry out during the heating cycle. Consequently, only these surfaces need be made from acid immune materials.

Another object of the invention is to have condensate flow through the recuperative heat exchanger in a direction opposite to the flow of combustion products.

Still another object of the invention is to operate the heat exchanger at temperatures substantially reduced from conventional heat exchangers.

Another object of the invention is to transfer sufficient heat from the products of combustion to cool them below their natural dew point.

Another object of the invention is to provide a recuperative heat exchanger for heating air wherein the flow of combustion products is substantially opposite to the flow of air which is to be heated.

These and other objects and advantages are provided by the invention which defines an apparatus for heating air, comprising means for providing combustion products, a recuperative heat exchanger having a plurality of upwardly inclined conduits, each of the conduits being connected to the providing means for receiving combustion products wherein a portion of combustion product condensate flows downward through the entire length of the conduits, the condensate flowing opposite the flow of combustion products, and means for moving air across the heat exchanger, the air being heated by thermal transfer of both sensible heat and heat of condensation from the combustion products. A portion of the downward flowing condensate may preferably evaporate within the conduits thereby raising the dew point of the combustion products. Recuperative heat exchangers are herein defined as heat exchangers which transfer both sensible heat and heat of condensation from combustion products to another fluid. The combustion product providing means may be a burner. The burner may be any suitable burner for oxidizing gaseous fuels. A burner suitable for oxidizing liquid fuels may also be used. The combustion product providing means may also be a nonrecuperative heat exchanger.

The invention also may be practiced by an apparatus for heating air, comprising means for providing combustion products, means for raising the dew point of combustion products from the providing means, an air duct, a recuperative heat exchanger positioned in the air duct for receiving combustion products from the dew point raising means, the heat exchanger having an inclined flow path for draining condensate backwards into the dew point raising means, and an air blower communicating with the duct for forcing air across the heat exchanger, the air being heated by thermal transfer of both sensible heat and heat of condensation from the combustion products. The combustion product providing means may be a nonrecuperative heat exchanger which heats either air or a liquid. Preferably, the dew point raising means may also provide means for removing a portion of gases from the combustion products which would otherwise form acids in the condensate. A portion of gases may be removed by directing combustion products against water wherein the water may absorb a portion of gases such as, for example, carbon dioxide, nitrogen dioxide and hydrogen chloride. The dew point raising means should raise the dew point of combustion products by at least 5° F. Stated another way, the water vapor content of the combustion products should be increased by approximately 25%.

The invention further defines a forced air furnace, comprising a burner for combusting fuel, a water reservoir adjacently positioned to the burner wherein combustion products from the burner evaporate water thereby mixing water vapor with the combustion products, a firebox enclosing the burner and the water reservoir, a vertical air duct, a recuperative heat exchanger having a plurality of upwardly inclined adjacent segments positioned in the air duct, the segments being interconnected in series thereby forming one continuous upwardly inclined heat exchanger, each of the segments having an equal plurality of conduits wherein respective conduits from the adjacent segments are interconnected in series thereby forming a plurality of continuous upwardly inclined conduits, the conduits being connected to the firebox for receiving the combustion products, the conduits also being coupled to the reservoir for draining combustion product condensate therein, and an air blower for forcing air down the air duct sequentially over the segments, the air being heated by thermal transfer of sensible heat from the combustion products and from heat of condensation released by condensation forming within the conduits. It may be preferable that means for spraying water particles into the firebox be provided. Water vapor would then be generated by evaporating the water particles in addition to, or in place of, evaporating water in the water reservoir. It may also be preferable for the furnace to include a blower for forcing a mixture of air and fuel into the burner.

The invention may also be practiced by a forced air furnace, comprising a firebox, a burner positioned in the firebox for combusting fuel, a water reservoir positioned in the firebox wherein combustion products from the burner are directed over the water reservoir thereby raising the dew point and lowering the temperature of the combustion products, a vertical air duct, a recuperative heat exchanger having a serpentine shape, the heat exchanger being positioned in the air duct at a continuous upward slope, the heat exchanger having a plurality of tubes surrounded by thermal transfer fins, each of the tubes being connected to the firebox for receiving combustion products, the tubes also being coupled to the water reservoir for draining combustion product condensate therein, and an air blower communicating with the air duct for forcing air down the duct and across the heat exchanger, the air being heated by thermal transfer of sensible heat from the combustion products and by heat of condensation released by condensation forming within the tubes. Preferably, the burner may be a radiant burner generating both combustion products and radiant energy to evaporate water in the water reservoir.

The invention also defines a forced air furnace, comprising a firebox, a water reservoir positioned in the firebox, a burner positioned in the firebox for combusting fuel, the burner directing combustion products against the water reservoir thereby elevating the dew point and lowering the temperature of the combustion products, a vertical air duct, an exhaust vent communicating with the air duct, a recuperative heat exchanger positioned in the air duct having a first upwardly inclined segment connected in series to a second upwardly inclined segment, the second segment being folded back over the first segment, the heat exchanger having a plurality of substantially parallel upwardly inclined tubes surrounded by metal fins in heat transfer relationship therewith, each tube having an inlet end coupled to the firebox and an outlet end coupled to the exhaust vent for transferring combustion products therebetween, the inlet ends also being coupled to the water reservoir for draining combustion product condensate therein, and an air blower communicating with the air duct for forcing air down the duct across the heat exchanger, the air being preheated by thermal transfer from the second heat exchanger segment, the preheated air being further heated by thermal transfer from the first heat exchanger segment. The furnace may preferably have an exhaust blower coupled to the exhaust vent for drawing combustion products from the heat exchanger. A pressure is thereby created within the heat exchanger that is less than the pressure outside the heat exchanger. In the unlikely event that a leak develops in the heat exchanger, combustion products will, therefore, not leak into the furnace chamber.

The invention also defines an apparatus for heating a liquid, comprising means for providing combustion products, a water reservoir coupled to the providing means wherein the combustion products flow across the reservoir thereby becoming elevated in dew point, a recuperative heat exchanger coupled to the reservoir wherein combustion products flow across the heat exchanger, the heat exchanger having a plurality of conduits forming a flow path for the liquid to be heated, the liquid being heated by thermal transfer of sensible heat from the combustion products and from heat of condensation released by condensation forming on the heat exchanger, the condensation draining across the heat exchanger into the reservoir, and means for moving the liquid through the heat exchanger. When the combustion product providing means is a nonrecuperative heat exchanger, a polypropylene enclosure may be used for enclosing the heat exchanger and the water reservoir. Since combustion products have already been lowered in temperature through a nonrecuperative heat exchanger and water evaporation further lowered the combustion product temperature, an acid resistant plastic material such as polypropylene may be used. It may be preferable for the recuperative heat exchanger to be a coil wherein the liquid flows through the coil. It may also be preferable for the recuperative heat exchanger to be a tube and fin heat exchanger wherein the liquid flows through the tubes. Preferably, combustion product condensate drains across the heat exchanger in a direction opposite to the flow of the combustion products.

The invention may further be practiced by the method of heating a fluid, comprising the steps of combusting fuel to provide combustion products, raising the dew point of the combustion products, and transferring heat from the combustion products to the fluid.

The invention may also be practiced by the method of heating air forced through a forced air furnace, comprising the steps of combusting fuel to provide combustion products, increasing the water vapor content of the combustion products by directing the combustion products against water wherein a portion of sensible heat from the combustion products is converted into latent heat of vaporization, and transferring both sensible heat and heat of condensation from the combustion products to the forced air.

BRIEF DESCRIPTION OF THE DRAWINGS

The foregoing and other objects and advantages of the invention will be more readily understood by reading the Description of the Preferred Embodiment wherein.

DESCRIPTION OF THE PREFERRED EMBODIMENT

Figure 1:
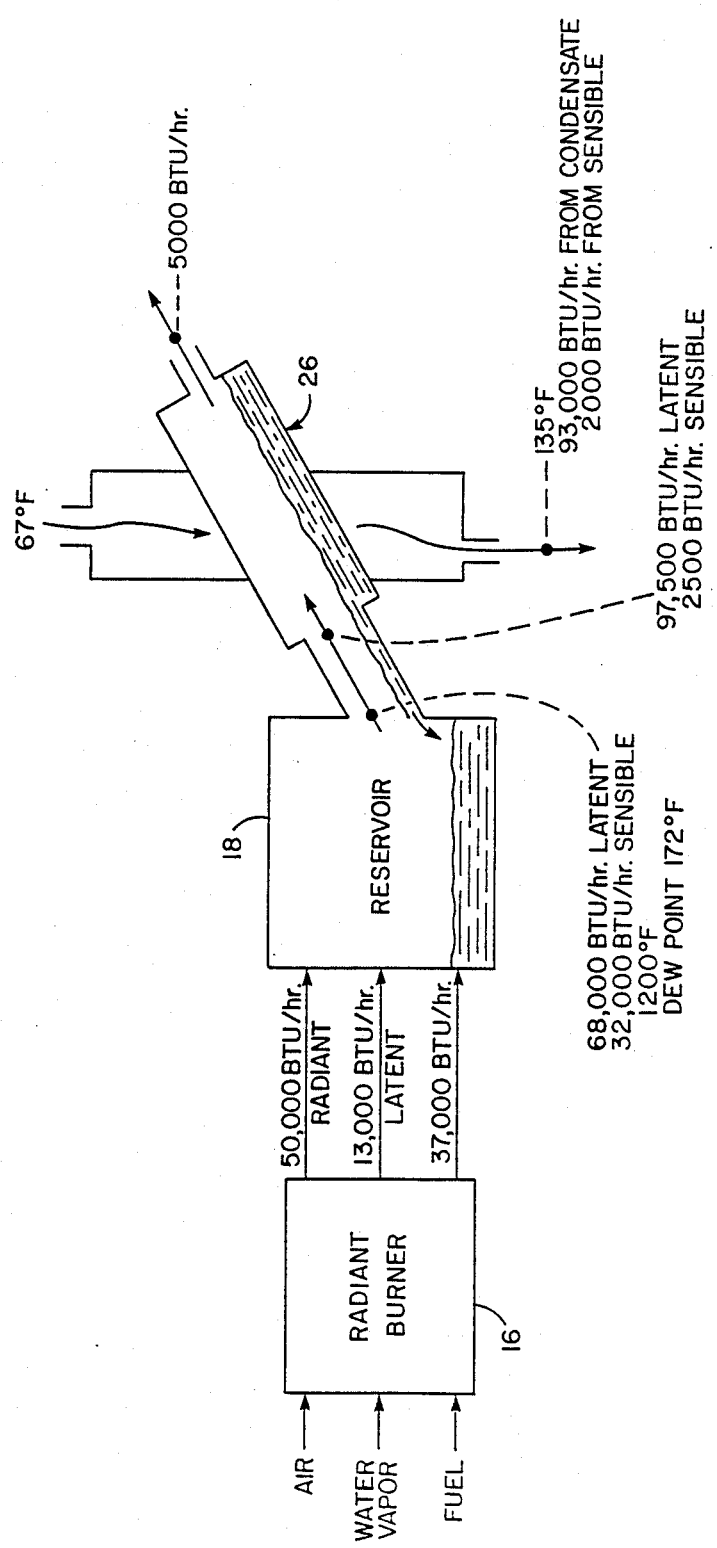
FIG. 1 is a block diagram of recuperative furnace 10.

Referring first to FIG. 1, there is shown a simplified block diagram depicting operation of a recuperative furnace. Radiant burner 16 is shown firing on water reservoir 18. Recuperative heat exchanger 26, having an upwardly inclined combustion product flow path, is shown coupled to the output of reservoir 18. Those skilled in the art will recognize that the depicted operational parameters such as temperature, dew point, and BTU/hr., are for illustration and discussion only, and that the invention could be used to advantage with many other combinations of operational parameters.

In the illustration of FIG. 1, radiant burner 16 oxidizes a mixture of air, water vapor, and fuel to generate 100,000 BTU/hr. of heat of which approximately 50,000 BTU/hr. are radiant heat. The remaining 50,000 BTU/hr. of heat may be potentially recovered from both combustion product sensible heat and latent heat of vaporization. Assuming a 30% excess air/fuel mixture and input air having a 10% water vapor content, combustion products may typically be generated at a temperature of 2,000° F. with an initial dew point of 128° F. Approximately 37,000 BTU/hr. of sensible heat and 13,000 BTU/hr. of latent heat of vaporization may then potentially be recovered from the combustion products.

Both radiant heat and combustion products from burner 16 are directed against water in water reservoir 18. As water is evaporated in reservoir 18, virtually all the 50,000 BTU/hr. of radiant heat and approximately 5,000 BTU/hr. of combustion product sensible heat are converted into latent heat of vaporization. Combustion products are thereby raised in dew point to approximately 172° F. and lowered in temperature to approximately 1200° F. About 68,000 BTU/hr. of latent heat of vaporization and 32,000 BTU/hr. of sensible heat may now potentially be recovered from the combustion products.

The combustion products are directed from reservoir 18 into tubes 42 (FIG. 2) of recuperative heat exchanger 26. Heat exchanger 26 is of fin and tube construction wherein air from a home or other enclosure to be heated flows across the fins. Heat is transferred from the combustion products to the air thereby cooling the combustion products and heating the air.

At the beginning of the heating cycle, a short transient phase occurs in heat exchanger 26, as will be explained in more detail later herein with particular reference to FIGS. 2-5. Briefly, combustion products are cooled as they flow through the upwardly inclined flow path of heat exchanger 26. A portion of the combustion products condense and flow downwards into warmer areas of heat exchanger 26 where they will re-evaporate. As condensate is evaporated, combustion product sensible heat is converted into latent heat. Combustion products will therefore be further lowered in temperature and further raised in dew point. Evaporation and condensation will then occur at successively earlier points within heat exchanger 26 until tubes 42 become totally covered by a film of condensate. Thus, heat exchanger 26 operates in what will be hereinafter referred to as the all wet mode.

The condensation/evaporation cycle within heat exchanger 26 will also result in the conversion of another 29,500 BTU/hr. of sensible heat into latent heat. The input to heat exchanger 26 will now see combustion products having approximately 97,500 BTU/hr. of latent heat and 2,500 BTU/hr. of sensible heat which may potentially be recovered.

Heat exchanger 26 is designed to cool combustion products to approximately 100° F. before exhausting them. Therefore, approximately 93,000 BTU/hr. of condensation heat and 2,000 BTU/hr. of sensible heat are transferred to the forced air. The air forced across heat exchanger 26 will consequently be heated from a typical ambient temperature of approximately 67° F. to approximately 135° F. Stated another way, 97% of heat is transferred by heat of condensation while 95% efficiency is maintained.

In sharp contrast, a conventional recuperative heat exchanger recovers approximately 12,000 BTU/hr. of latent heat and 83,000 BTU/hr. of sensible heat. It is therefore readily apparent that the increased recovery of latent heat has fully offset the smaller temperature differential between combustion products and air to be heated.

Several anti-corrosion advantages are obtained by the configuration described above. One advantage is that by directing combustion products against water, a portion of potentially acidic forming gases are absorbed before entering the heat exchanger. Another advantage is that condensate will continuously drain into water reservoir 18 thereby flushing corrosive acids from heat exchanger 26.

Still another advantage is obtained by operating totally in the wet mode along the entire length of tubes 42. That is, areas wherein condensate may dry during the heating cycle are eliminated. These areas would otherwise be particularly prone to corrosion since water evaporization would leave behind acids of maximum concentration. In prior recuperative furnaces, these areas were particularly prone to corrosion.

A further advantage is obtained by reducing the operating temperature of heat exchanger 26. The chemical rate of any corrosive attack is markedly reduced in the event that acidic residue is not totally flushed.

Figure 2:
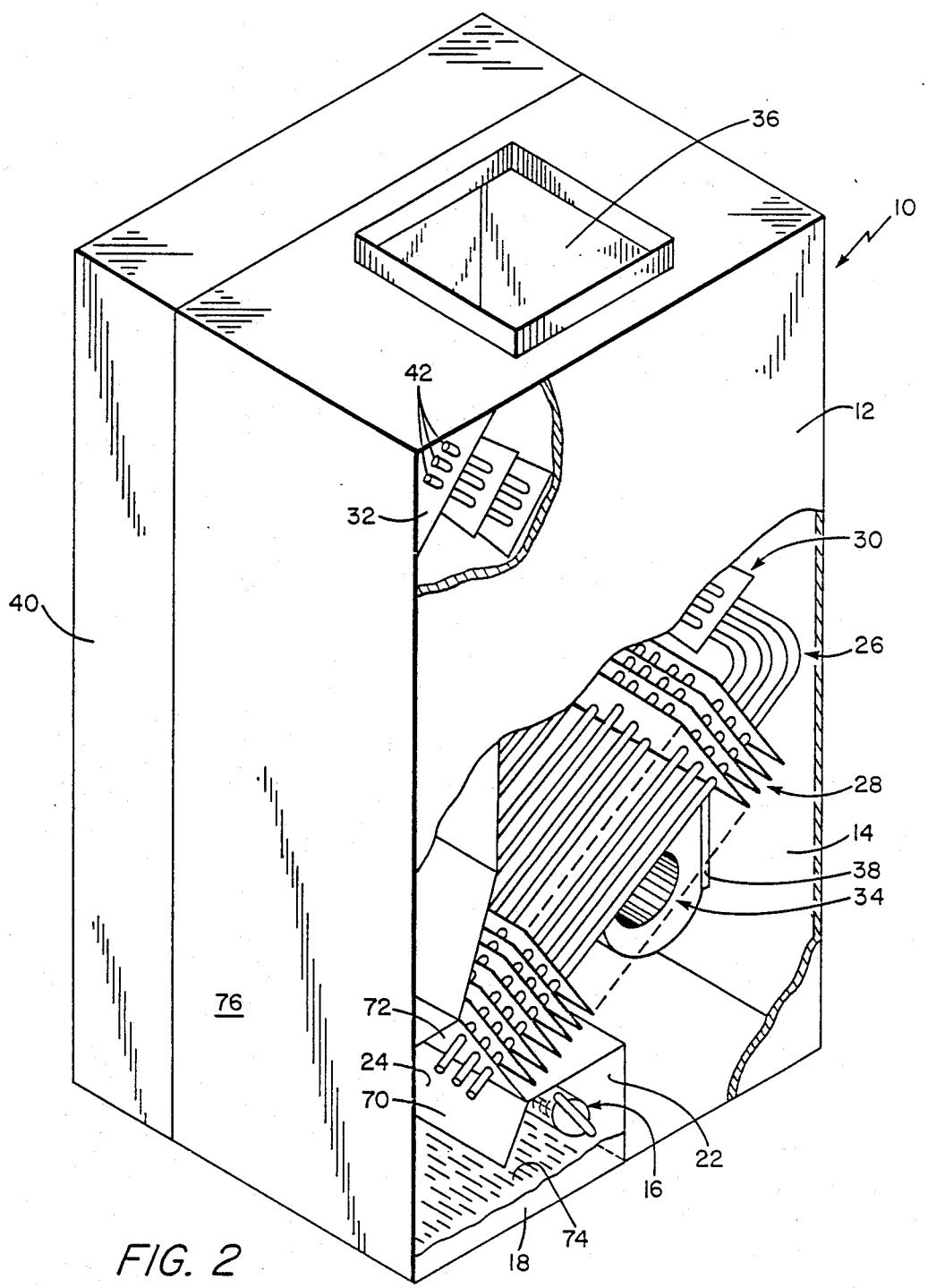
FIG. 2 is a partially broken away, right front perspective view of recuperative furnace 10 showing furnace chamber 14.
Figure 3:
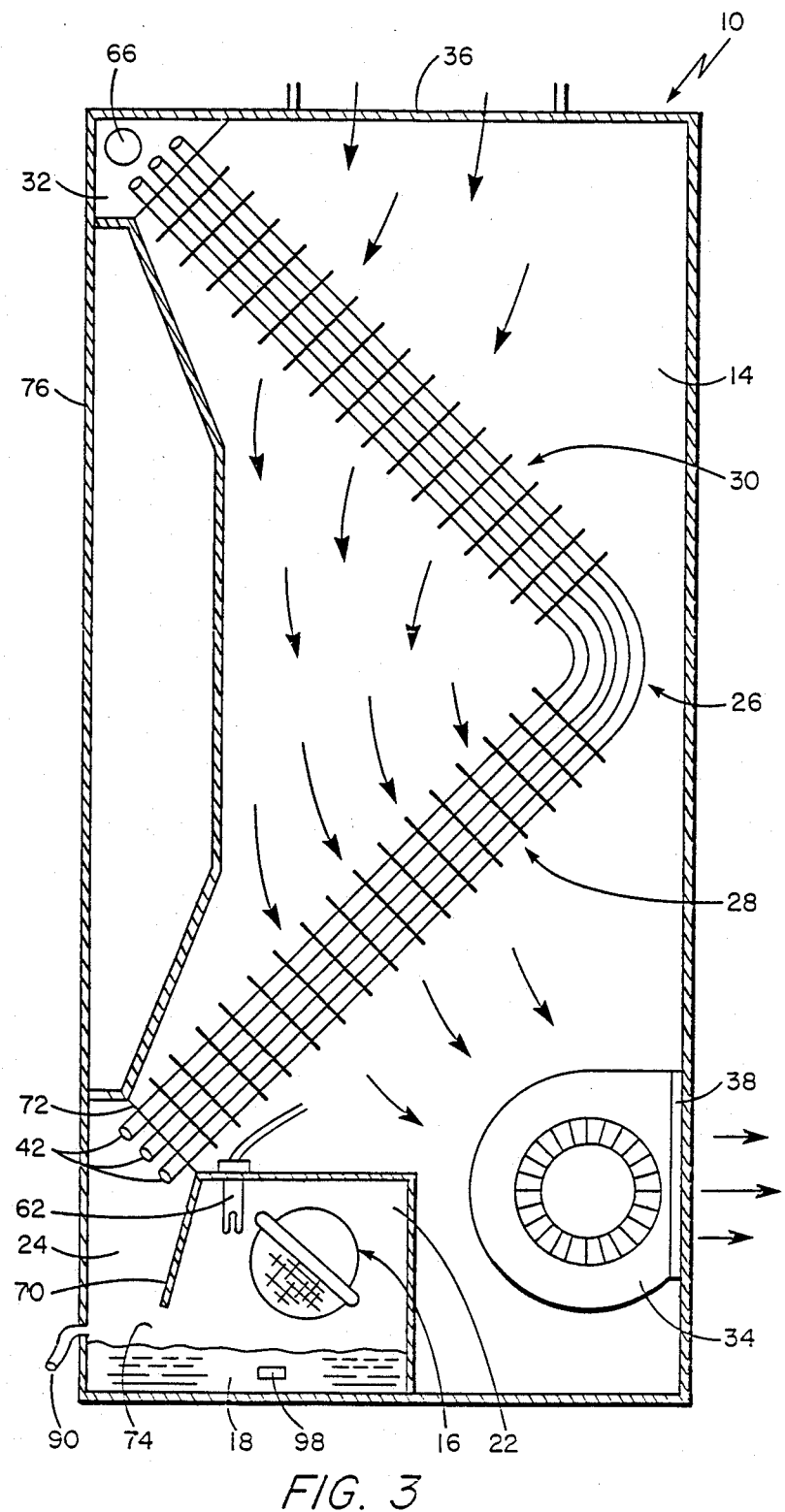
FIG. 3 is a side elevation view of FIG. 2 with side panel 12 removed.

A more detailed description of the preferred embodiment is now made in reference to FIGS. 2 and 3. FIG. 2 illustrates a partially broken away, perspective view of recuperative furnace 10. For additional clarity, a side elevation view of furnace 10 with side panel 12 removed is shown in FIG. 3. Furnace 10 is broadly made up of furnace chamber 14, radiant burner 16, water reservoir 18, firebox 22, manifold 24, recuperative heat exchanger 26, exhaust plenum 32, blower assembly 34, return air port 36, hot air port 38 and components chamber 40.

Recuperative heat exchanger 26 is of fin and tube construction which is well known in the art. Heat exchanger 26 is further defined by first and second heat exchanger segments 28 and 30, respectively, which are interconnected in series. Tubes 42 of heat exchanger 26 form a flow path through segments 28 and 30 for transferring combustion products between firebox 22 and exhaust plenum 32 as will be described later herein.

Figure 4:
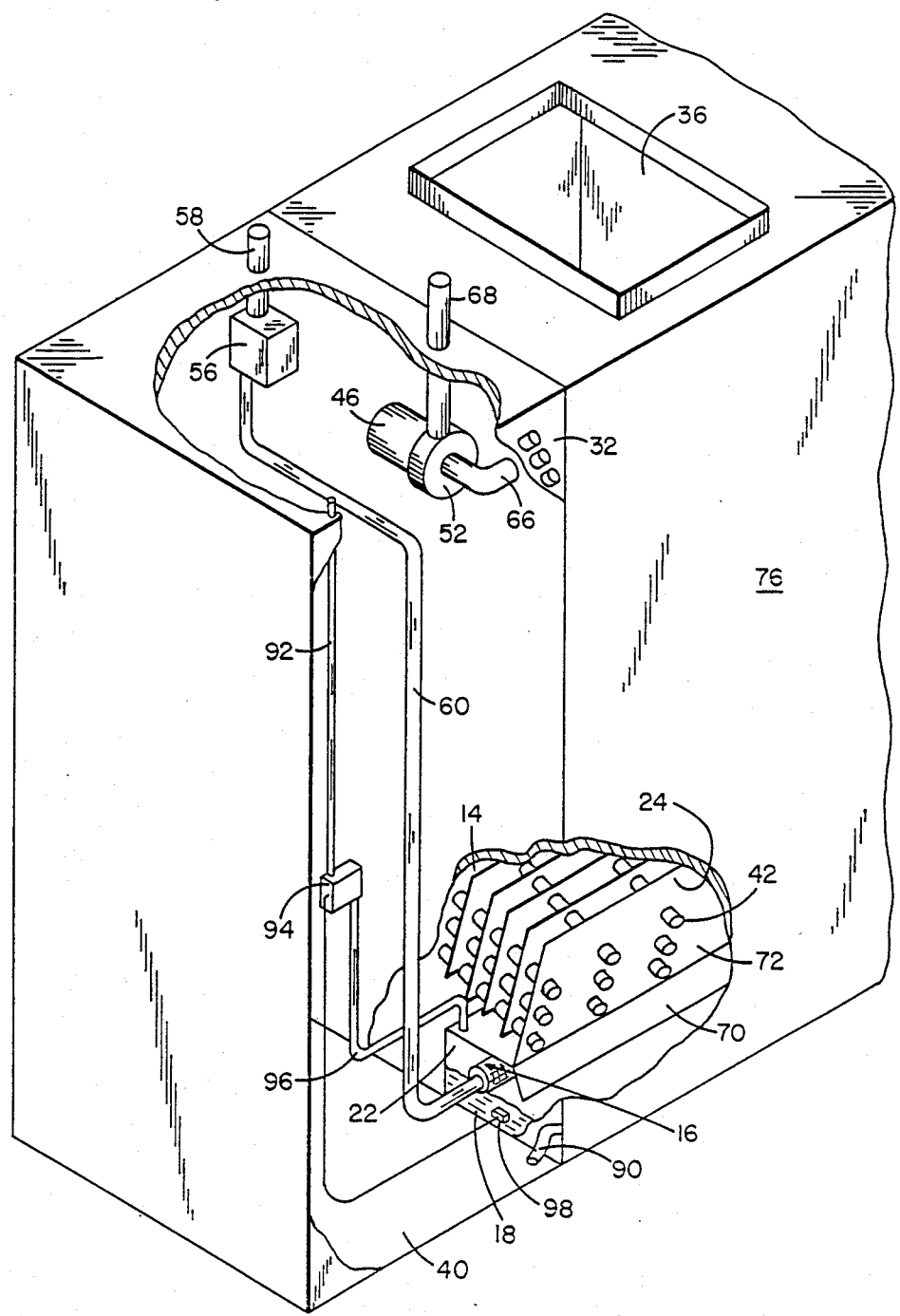
FIG. 4 is a partially broken away, left front perspective view of recuperative furnace 10 showing components chamber 40 and a portion of furnace chamber 14.

The flow of fuel into firebox 22 is best seen in FIG. 4 which is a partially broken away left front perspective view of furnace 10 illustrating components compartment 40 and a portion of furnace chamber 14. Motor 46 is shown driving exhaust products blower 52. Fuel valve 56, input fuel line 58, fuel pipe 60 and burner 16 are connected together in series. Upon a call for heat and in accordance with the furnace controls as will be described later herein, with particular reference to FIG. 6, electric current flows through ceramic igniter tip 62 (FIGS. 3 and 5) heating it to approximately 2500° F. After a time delay from the call for heat, fuel valve 56 is opened and motor 46 activated. A gaseous fuel is then directed into burner 16. As will be described in more detail later herein, exhaust products blower 52 is also activated for drawing exhaust products from plenum 32 via exhaust pipe 66 and forcing the exhaust products out flue pipe 68.

Figure 5:
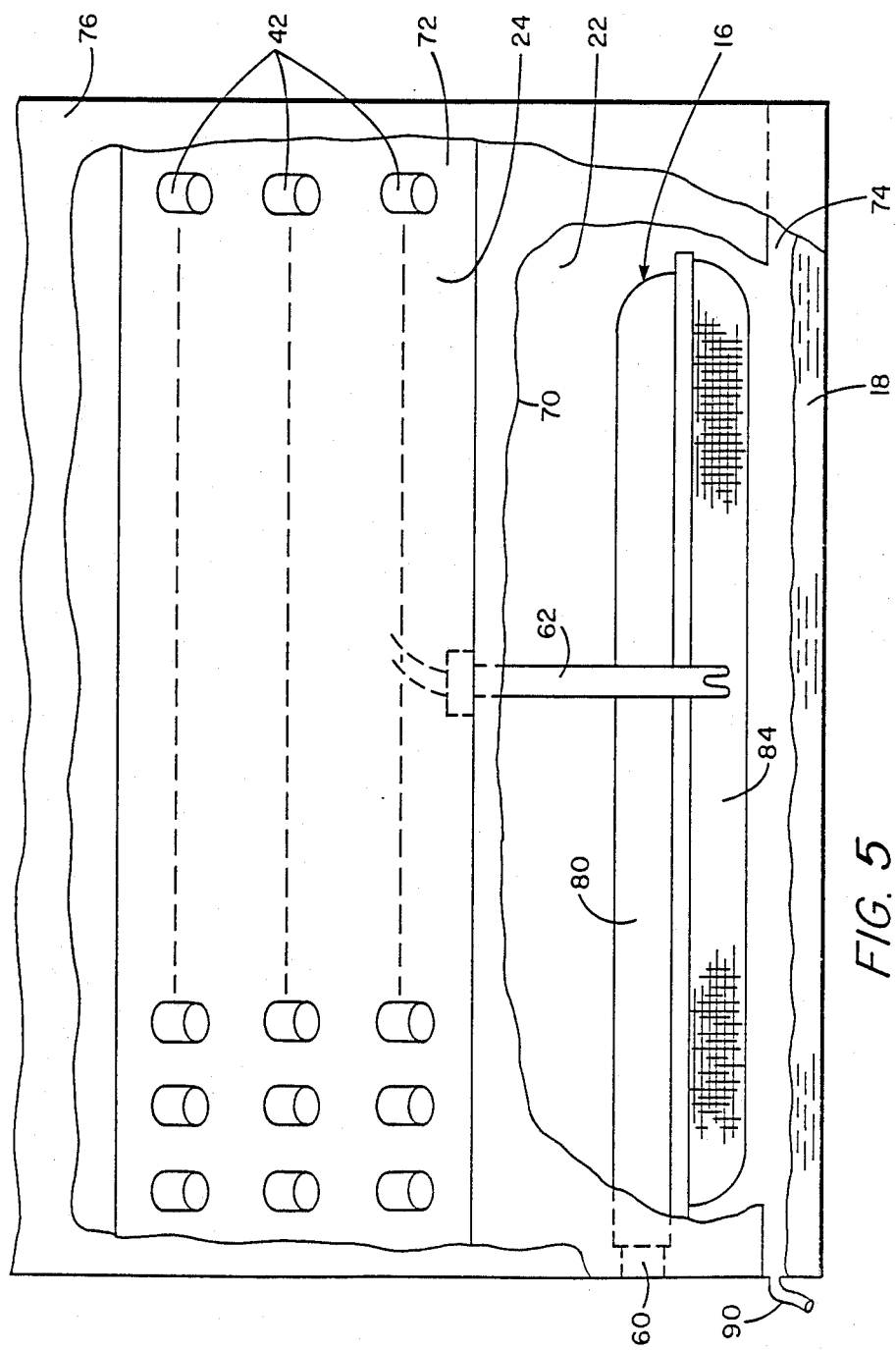
FIG. 5 is a partially broken away front elevation view of furnace chamber 14 showing firebox 22 and manifold 24.

Referring now to FIG. 5 and continuing with FIGS. 2-4, the flow of combustion products is now described. Firebox 22 forms a chamber across the front of furnace chamber 14 partially enclosing burner 16 and water reservoir 18. Burner 16 is here shown as a conventional radiant burner defined by conduit 80 and metal screen 84. A baffle 70 extending downwards from firebox 22 towards water reservoir 18 provides an opening 74 above reservoir 18. Wall 72, having heat exchanger tubes 42 inserted therein, extends upwards from firebox 22 to furnace wall 76 defining manifold 24. Firebox 22, reservoir 18 and manifold 24 are shown without appropriate insulation or firewalls because a detailed description of them is not necessary for an understanding of the invention.

Accordingly, the gaseous fuel enters conduit 80 and is deflected substantially downward through screen 84 at increased velocity and reduced pressure. Igniter 62 then ignites the fuel/air mixture generating combustion products across the surface area of screen 84. Radiant burner 16 therefore acts in a conventional manner as both a gas burner and infrared generator wherein a portion of combustion product heat is converted into infrared energy across screen 84. In this manner, the temperature of combustion products exiting burner 16 is less than 2000° F. whereas a typical gas burner might generate combustion products at approximately 2800° F. Although a conventional tubular burner could be used, an advantage is obtained by using a radiant burner since nitrogen oxides are not formed in significant quantities at temperatures less than 2000° F. Thus, formation of nitric acid in the combustion product condensate is markedly reduced. Further, $NO_x$ flue emission stnadards of California will not be exceeded. See Rule 1111, issued by South Coast Air Quality Management District, 9150 Flair Drive, El Monte, Calif. 91731.

Burner 16 directs both combustion products and radiant energy against water reservoir 18 thereby evaporating a portion of the water contained therein. Consequently, combustion products become elevated in dew point and lowered in temperature as a portion of combustion product sensible heat is converted into latent heat of vaporization. For the embodiment described herein, and assuming a 30% excess air fuel mixture, combustion products are elevated from a natural dew point of approximately 128° F. to a dew point of approximately 172° F. at an approximate temperature of 1200° F.

Those skilled in the art will recognize that there are numerous other configurations for combustion product dew point elevation. For example, a water atomizer may be used in conjunction with reservoir 18, or in place of reservoir 18, to spray particles of water into the flow of combustion products. A slinger, such as the one illustrated in FIG. 8, may also be used to throw water from reservoir 18 throughout firebox 22. In this manner, the walls of firebox 22 would also be kept cooler.

Continuing with FIGS. 2–5, dew point elevated combustion products are directed from firebox 22, through opening 74, through manifold 24, through tubes 42 of first heat exchanger segment 28, through tubes 42 of second heat exchanger segment 30, into plenum 32. Exhaust blower 52 draws combustion products from plenum 32 thereby creating a forced induction system for drawing combustion products through firebox 22 and heat exchanger 26.

As air is drawn over heat exchanger 26, which will be explained later herein with particlar reference to FIG. 6, combustion products are cooled sufficiently by thermal transfer to condense partially within tubes 42 and, accordingly, transfer heat of condensation. The point at which condensation begins will vary during a brief transitory period at the beginning of the heating cycle. Condensation will first randomly occur on the initially cool surface areas of heat exchanger tubes 42. Additional condensate is formed throughout segment 30 when combustion products are cooled to their dew point. When steady state heat exchanger temperatures are approached, downward flowing condensate will re-evaporate in the warmer areas of segment 28. Combustion products will then become further elevated in dew point and further lowered in temperature. Condensation then occurs at successively earlier points within heat exchanger 26 until the entire inner surface areas of tubes 42 are substantially covered by a film of downward flowing condensate. The entire length of heat exchanger 26 then operates in the wet mode.

The condensate drains by gravity from tubes 42, through manifold 24, into water reservoir 18. Since potentially acid forming combustion products are progressively absorbed by condensate as combustion products flow through heat exchanger 26, the condensate progressively becomes closer to a neutral pH. For example, the condensate in segment 30 will be at a higher pH than the condensate in segment 28. Consequently, heat exchanger tubes 42 are flushed by progressively purer condensate. Any residual acidic condensate which may be left in tubes 42 after the heating cycle is therefore minimized.

Referring to FIG. 3, drain 90 is positioned in reservoir 18 and connected to the domestic sanitary drain system for disposal of excess condensate. Since combustion products are cooled to less than their natural dew point of 128° F., heat exchanger 26 produces more condensate than is evaporated by burner 16. Accordingly, excess condensate will flush reservoir 18 preventing the concentration of acids therein.

In the event that the heating cycle begins with a dry reservoir 18, all wet operation will still be achieved. Heat exchanger 26 is designed to cool combustion products at 2000° F. to less than 128° F. Condensation will therefore occur within tubes 42 when there is no water in reservoir 18. Condensate will then flow downward and re-evaporate in the manner previously described.

Since furnace 10 is a net producer of water, the excess condensate will fill an initially dry reservoir 18. That is, furnace 10 is self priming.

It is apparent from the above that heat exchanger 26 must be designed to achieve specific criteria. More specifically, the forced air flow across the heat exchanger fins, fin geometry, tube length, tube diameter and rate of flow of combustion products through the tubes should be designed to cool combustion products from firebox 22 to 90° F.-120° F. The rate of combustion product flow should be designed for a high rate turbulent flow to maximize dry heat transfer coefficients, but the flow rate should not be large enough to force condensate into plenum 32. Further, in the event that reservoir 18 starts out dry, heat exchanger 26 should be designed to cool the hotter than normal combustion products to less than their natural dew point.

Figure 6:
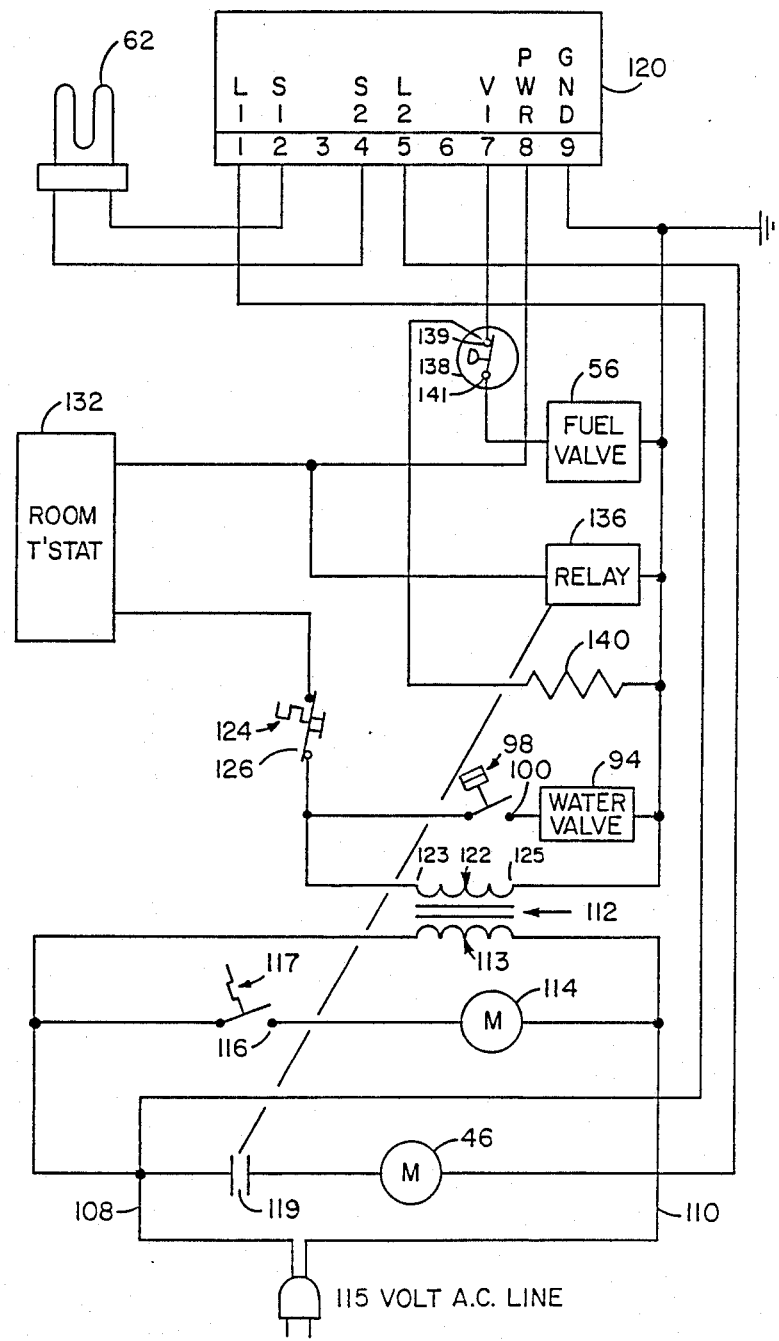
FIG. 6 is an illustrative electrical schematic for the controller of recuperative furnace 10.

Referring to FIG. 6, there is shown an electrical schematic which functions as the controller for recuperative furnace 10. Terminals 108 and 110 are connected to a standard household 115-volt AC source as shown. Accordingly, the AC voltage appears across the series of motor 46 and normally open fuel/air blower contacts 119, the series of air blower motor 114 and normally open air blower control contacts 116 of temperature activated switch 117, primary winding 113 of step down transformer 112, and terminals 1 and 5 of ignition control 120. The voltage across the secondary winding 122 of step down transformer 112 is reduced to approximately 24 volts. This secondary voltage appears across the series of water valve 94 and normally open water level contacts 100 of water level switch 98. Further, side 123 of secondary winding 122 is connected through a secondary limiter 124, which consists of manually reset normally closed temperature activated contacts 126, to one terminal of room thermostat 132. The opposite terminal of thermostat 132 is connected to power input terminal 8 of ignition control 120 and one terminal of relay 136. Side 125 of secondary winding 122 is connected through blower control resistant heater 140 to terminal 139 of pressure switch 138, to the opposite terminal of relay 136, through fuel valve 56 to terminal 141 of pressure switch 138, and to grounded terminal 9 of ignition control 120. Terminal 7 of ignition control 120 is connected to terminal 139 of pressure switch 138. Further, igniter 62, which was described earlier as a ceramic electronic igniter tip is connected across terminals 2 and 4 of igniter control 120. The components described herein with reference to FIG. 6 are conventional and well known in the art. For example, although the functions of ignition control 120 as described herein would be performed using a plurality of relays, it may be preferable to use a solid state device which is commercially available from Fenwal, Inc., Division of Kidde, Inc., of Ashland, Massachusetts, as Catalog Order No. 05-212225-107. Also, igniter 62 is commercially available as Model No. 201A from Norton Company of Milford, New Hampshire.

Upon call for heat from room thermostat 132 as mentioned earlier herein, contacts internal thereto close allowing current to flow from secondary winding 122, through secondary limiter 124 and thermostat 132, thereby energizing power terminal 8 of ignition control 120. Current also flows from room thermostat 132 activating relay 136. The activation of relay 136 closes normally open contacts 119. Closing contacts 119 completes the line voltage circuit through motor 46 that drives exhaust products blower 52.

Combustion products are drawn from plenum 32 and forced out flue pipe 68 by exhaust blower 52. Less than atmospheric pressure is therefore maintained in heat exchanger 26 which will prevent combustion products from leaking into furnace chamber 14 in the event of a leak in heat exchanger 26.

The energizing of ignition control 120 causes igniter 62 to be energized by internally connecting pin 1 to pin 2 and pin 4 to pin 5 within ignition control 120. After a time delay in which igniter 62 heats to its specified ignition temperature, ignition control 120 opens fuel valve 56 and energizes air blower control resistance heater 140 by internally providing power from pin 8 to pin 7. Pin 7 is connected to fuel valve 56 through pressure switch 138.

Activation of fuel valve 56 allows gas to enter burner 16 where it is ignited by igniter 62 as previously described.

When air blower control resistance heater 140 has reached a predetermined temperature, air blower control contacts 116, which are in heat exchange relationship with heater 140, close to complete a line voltage circuit through air blower motor 114. Motor 114 turns blower assembly 34 to move return air through furnace 10 as shown in FIGS. 2 and 3. Cool air returning from the home or other enclosure to be heated is drawn into return air port 36 from a return air duct (not shown). It typically may be at a temperature of 67° F. The air is heated as it is drawn through segments 28 and 30 of tube and fin heat exchanger 26. The folded over segments 28 and 30 of heat exchanger 26 approximate forced air flow being substantially opposite to combustion product flow.

More specifically, air is preheated as it is drawn across second heat exchanger segment 30 by transfer of both sensible heat and heat of condensation from combustion products. The temperature of the preheated air is typically elevated to approximately 81° F. Preheated air is then drawn across first heat exchanger segment 28 where it is heated further by transfer of both sensible heat and heat of condensation. Typically, the forced air will be heated to a temperature of approximately 135° F. before being expelled through hot air port 38 by blower assembly 34. From air port 38 the air may be forced through conventional duct work to the enclosure or home to be heated.

Referring back to FIG. 6, when room thermostat 132 is satisfied, the secondary voltage circuit through it is opened thereby removing power to ignition control 120 and relay 136. Ignition control 120 then closes fuel valve 56. When power is removed from relay 136, contacts 119 open interrupting the line voltage circuit across motor 46. Drive is then removed from exhaust blower 52.

Motor 114 however continues to drive blower assembly 34 to force heated air into the home or other enclosure to be heated until blower control contacts 116 open. Blower control contacts 116 are in heat exchange relationship with heat exchanger 26 and open when heat exchanger 26 is cooled to a predetermined temperature.

Two safety interlocks are now described. The first interlock is provided by pressure activated switch 138 which is located on manifold wall 72 (not shown). Switch 138 will open, deenergizing fuel valve 56, in the unlikely event that a blocking of combustion products causes excessive back pressure within manifold 24.

The second safety interlock is provided by water level switch 98. Inlet water pipe 92, water level valve 94, water reservoir conduit 96 and water reservoir 18 are interconnected in series (FIG. 4). Water level switch 98 is coupled to reservoir 18. Accordingly, if the water level of reservoir 18 becomes depleted due to evaporation during long standby periods, contacts 100 of switch 98 will close activating valve 94. Water reservoir 18 will then be refilled to a predetermined level.

The water level back-up system however is not essential since heat exchanger 26 produces sufficient condensate to fill an initially dry reservoir 18.

A first alternate embodiment is now described wherein high efficiency and all wet operation are obtained without a water reservoir. A conventional burner may be connected directly to heat exchanger 26. Assuming the previously described input conditions, combustion products at 2800° F. and a dew point of 128° F. will be generated. Condensation will still occur in heat exchanger 26 since it has sufficient cooling capacity to cool the combustion products from 2800° F. to less then their natural dew point. Condensate will therefore flow downward through tubes 42 and re-evaporate in the manner previously described. The condensation/evaporation cycle of heat exchanger 26 will raise the dew point and lower the temperature of incoming combustion products. Thus, furnace 10 will operate in the all wet mode without reservoir 18.

Figure 7:
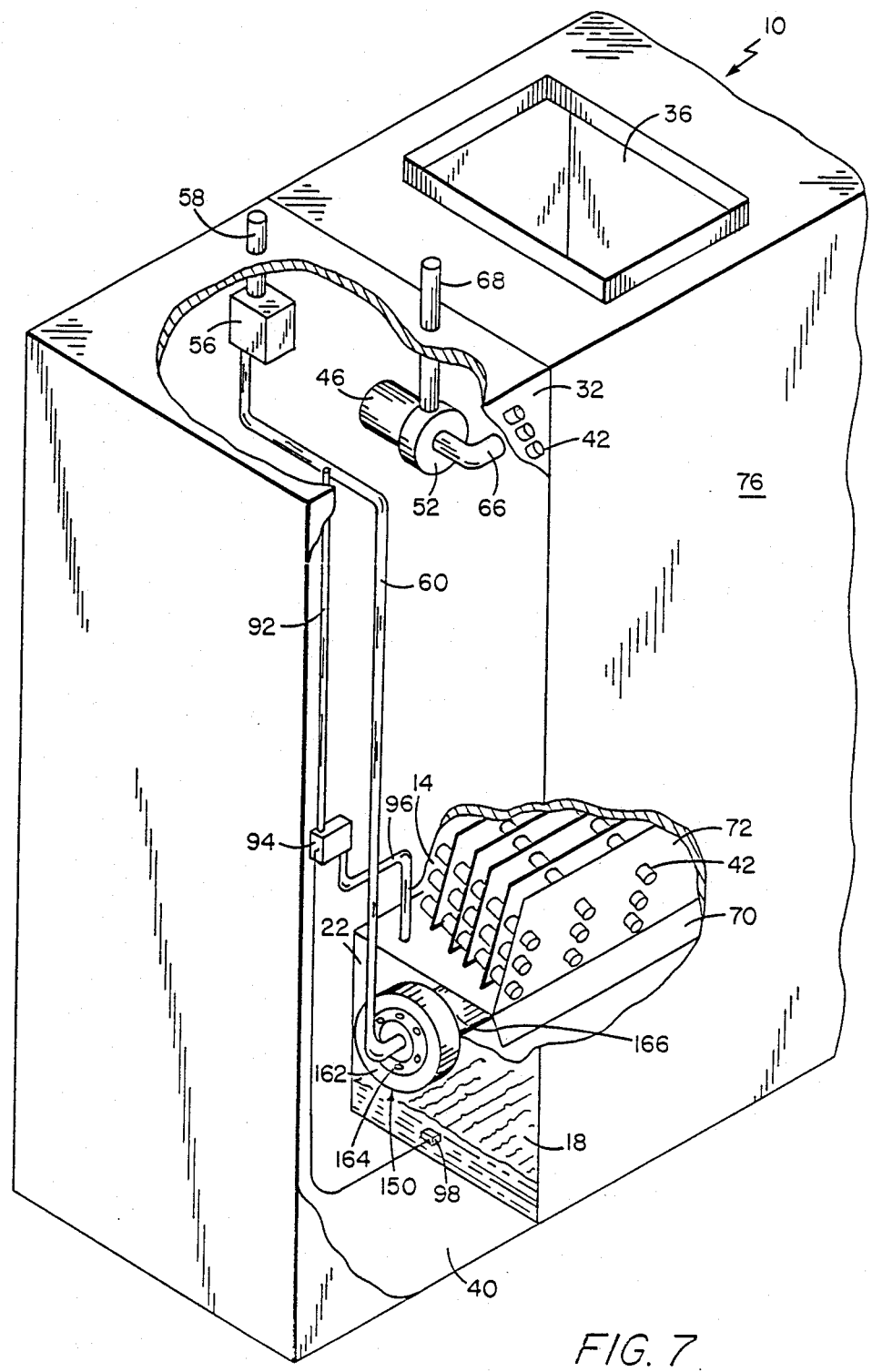
FIG. 7 is a partially broken away, left front perspective view of recuperative furnace 10 illustrating a liquid fuel burning embodiment.
Figure 8:
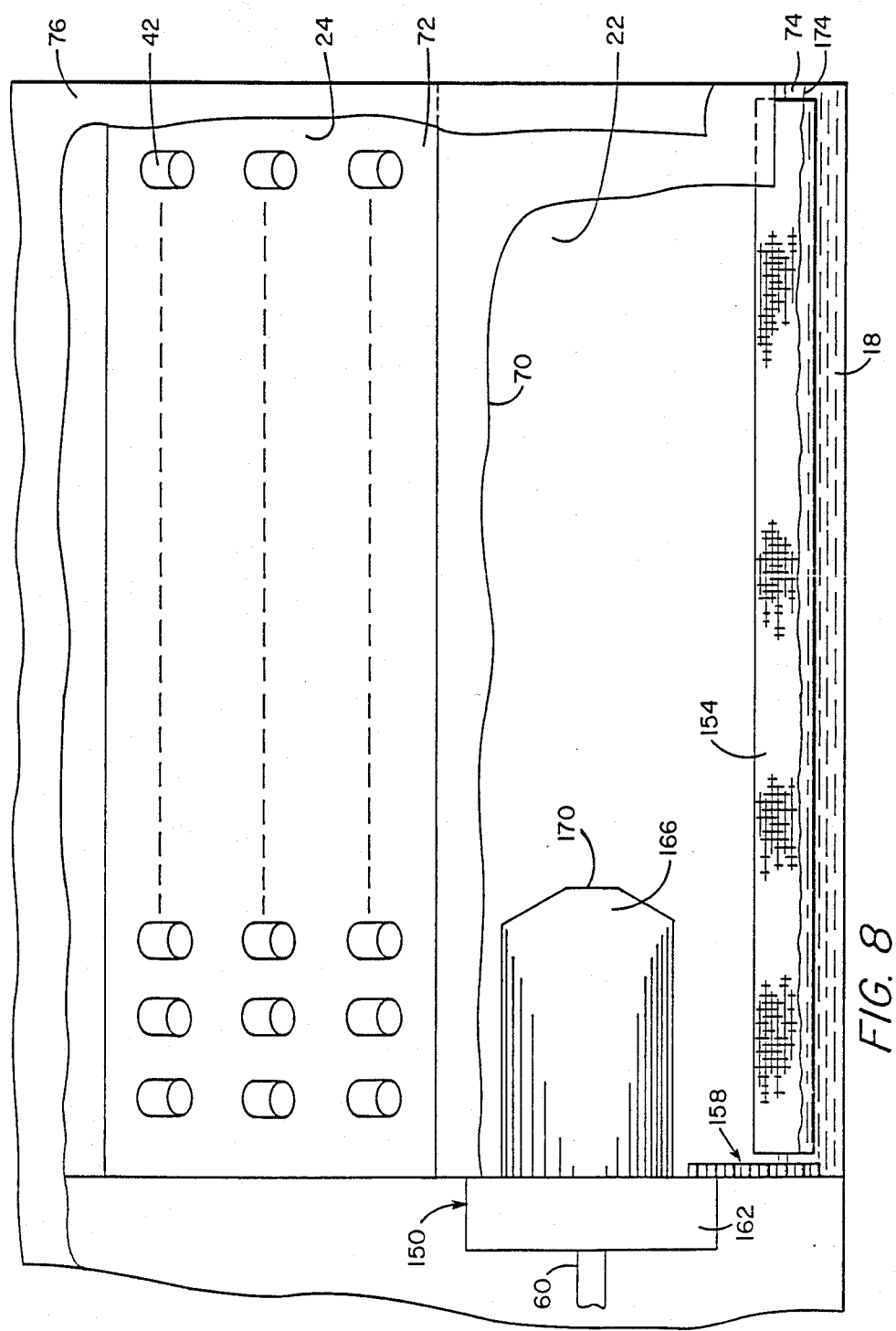
FIG. 8 is a partially broken away front elevation view of furnace chamber 14 showing manifold 24 and firebox 22 being adapted for a liquid fuel burning embodiment.

A second alternate embodiment, for burning fuel oil or other liquid fuels, is now described with particular reference to FIGS. 7 and 8. The operation of the liquid fuel embodiment is the same as the gaseous fuel embodiment, as previously described, with two general modifications. First, the flow of liquid fuel and combustion of liquid fuel are different. Second, the apparatus for mixing water vapor with combustion products in firebox 22 is modified.

Except for the differences discussed below, all components of the liquid fuel embodiment are the same as those illustrated in FIGS. 2-6. Radiant burner 16 is replaced by oil burner 150. Ignitor 62 is not shown since it is now an internal component of oil burner 150. Firebox 22 is shown having a larger volume to enable complete combustion of the liquid fuel. Slinger 154 is added to throw water from reservoir 18 into firebox 22. Gear driving mechanism 158 is added for turning slinger 154.

The flow of liquid fuel into firebox 22 is first described in reference to FIG. 7 which is a partially broken away, left front perspective view of furnace 10 illustrating components compartment 40 and a portion of furnace chamber 14. FIG. 7 is the liquid fuel equivalent of FIG. 4 except for the differences noted above.

A conventional liquid fuel burner 150 is shown having an electric motor 162. Motor 162 drives a fuel pump (not shown) and air blower (not shown) for generating a fuel/air mixture within burner chamber 166. Liquid fuel burner 150, valve 56, input fuel line 58 and fuel pipe 60 are connected together in series. Motor 162 is electrically connected in parallel (not shown) with exhaust products blower motor 46. After a time delay from a call for heat, as previously described with particular reference to FIG. 6, fuel valve 56 is opened and motor 162 activates. Liquid fuel is then forced through a conventional pump and nozzle assembly (not shown) into chamber 166. Air is also drawn in through apertures 164 thereby generating a fuel/air mixture in chamber 166.

Referring now to FIG. 8, the flow of combustion products is described. FIG. 8 is a partially broken away front elevation view of furnace chamber 14 showing firebox 22 and manifold 24. FIG. 8 is the liquid fuel equivalent of FIG. 5 with the differences noted above. Chamber 166 having combustion product aperture 170 is positioned within firebox 22. Slinger 154 is a tubular screen which is positioned partially below water level 174 of water reservoir 18. A conventional gear driving mechanism 158 couples motor 162 to slinger 154. Other driving mechanisms may be used to turn slinger 154 such as, for example, a belt and pulleys. An electric motor may also be used to turn slinger 154.

Accordingly, the fuel/air mixture in chamber 166 is ignited by an electrical ignitor (not shown) in accordance with the furnace controls previously described. Combustion products at approximately 2800° F. are then forced through aperture 170 into firebox 22. Simultaneously, slinger 154 rotates thereby throwing particles of water throughout firebox 22. Combustion products will evaporate a portion of water in reservoir 18 and a portion of water particles in firebox 22. As combustion product sensible heat is converted into latent heat of vaporization, the combustion products will become elevated in dew point to approximately 170° F. and lowered in temperature to approximately 1200° F.

Dew point elevated combustion products are then directed through manifold 24 into tubes 42 of heat exchanger 26. Furnace 10 will thereafter operate the same as the gaseous fuel embodiment described with reference to FIGS. 2–6.

The same advantages obtained by the gaseous fuel embodiment will also apply to the liquid fuel embodiment. In addition, the downward flowing condensate will flush ash and carbon deposits from heat exchanger 26. When burning fuel oil, ash and carbon deposits would otherwise clog tubes 42. Also, a portion of combustion product particulates will be scrubbed away in firebox 22 by slinger 54. A portion of sulphur dioxide will also be absorbed by water in firebox 22 and condensate in tubes 42. Therefore, besides anticorrosion advantages, noxious exhaust emissions will also be reduced.

A third alternate embodiment is now described wherein combustion products are first directed through a dry heat transfer process. The combustion products from the dry process are then elevated in dew point before being directed into a recuperative heat transfer process.

Figure 9:
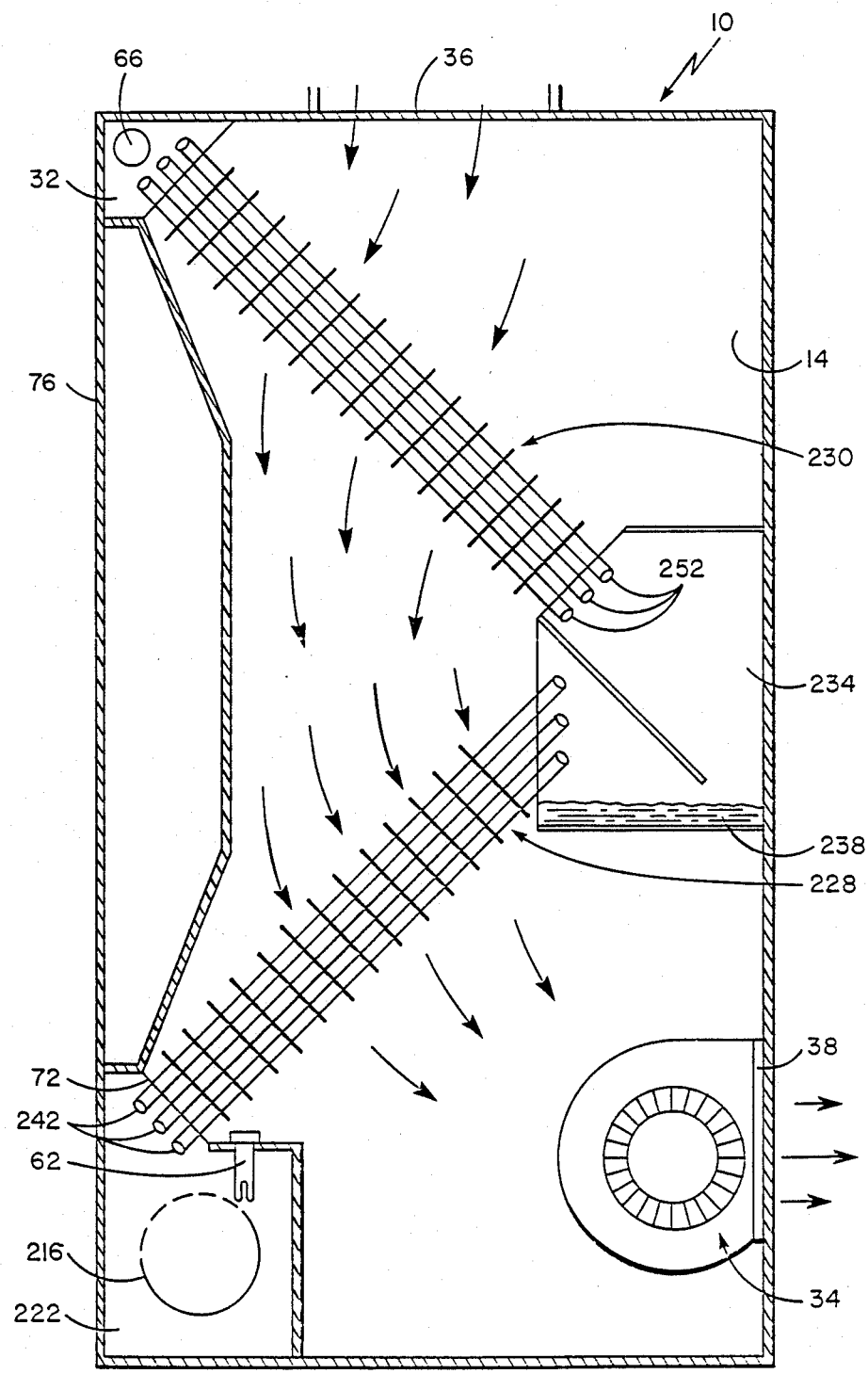
FIG. 9 is a right side elevation view of recuperative furnace 10 illustrating a two stage, dry and condensing, embodiment.

This third embodiment is illustrated in FIG. 9 which shows a side elevation view of furnace 10. A conventional tubular burner 216 is positioned in firebox 222. Tubes 242 of non-recuperative heat exchanger 228 are connected between firebox 222 and manifold 234. Manifold 234 encloses water reservoir 238. Tubes 252 of recuperative heat exchanger 230 are connected between manifold 234 and exhaust plenum 32. All other components of furnace 10 remain the same as described with particular reference to FIGS. 2–6.

Burner 216 generates combustion products at approximately 2800° F. with a dew point of approximately 128° F. The combustion products are drawn from firebox 222 through nonrecuperative heat exchanger 228 by the induced draft created by exhaust products blower 52, as described previously herein. Combustion product sensible heat is transferred to the air forced across heat exchanger 228 thereby cooling the combustion products to a temperature which is above their dew point.

The combustion products are then drawn from heat exchanger 228, into manifold 234 and across water reservoir 238. A portion of remaining combustion product sensible heat is transferred into latent heat of vaporization as water is evaporated from reservoir 238.

Dew point elevated combustion products are then drawn through recuperative heat exchanger 230 into exhaust plenum 32. As combustion products are cooled to approximately 100° F., both sensible heat and heat of condensation are transferred to the forced air flowing across recuperative heat exchanger 230.

Condensate from combustion products flow downward through tubes 252 of heat exchanger 230 into reservoir 238. Since combustion products were elevated in dew point by reservoir 238, the flow of condensate is greater than the condensate flow in a conventional recuperative heat exchanger wherein only burner latent heat of vaporization is recovered. Consequently, the anticorrosion advantages of the preferred embodiment are applicable to this third alternate embodiment.

Further, manifold 234 is operating at sufficiently low temperatures to permit the use of inexpensive, acid resistant materials such as, for example, polypropylene. Operating temperatures of manifold 234 are low for three reasons. First, entering combustion products have been reduced in temperature from heat transfer through nonrecuperative heat exchanger 228. Second, combustion products entering manifold 234 are further reduced in temperature by evaporating water in reservoir 238. Third, water reservoir 238 operates as a heat sink.

A poor heat transfer material such as polypropylene may be used in the construction of manifold 234 since an adiabatic process occurs therein. That is, a portion of combustion product sensible heat is converted into latent heat of vaporization rather than being transferred to the forced air.

Figure 11:
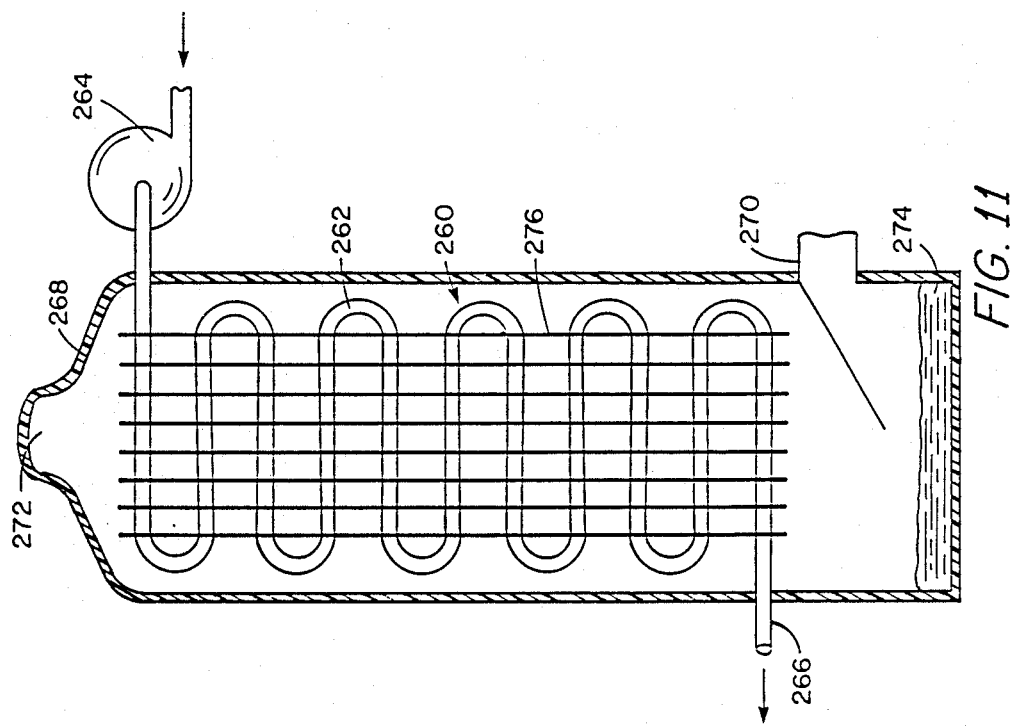
FIG. 11 is a side elevation view of FIG. 10.
Figure 10:
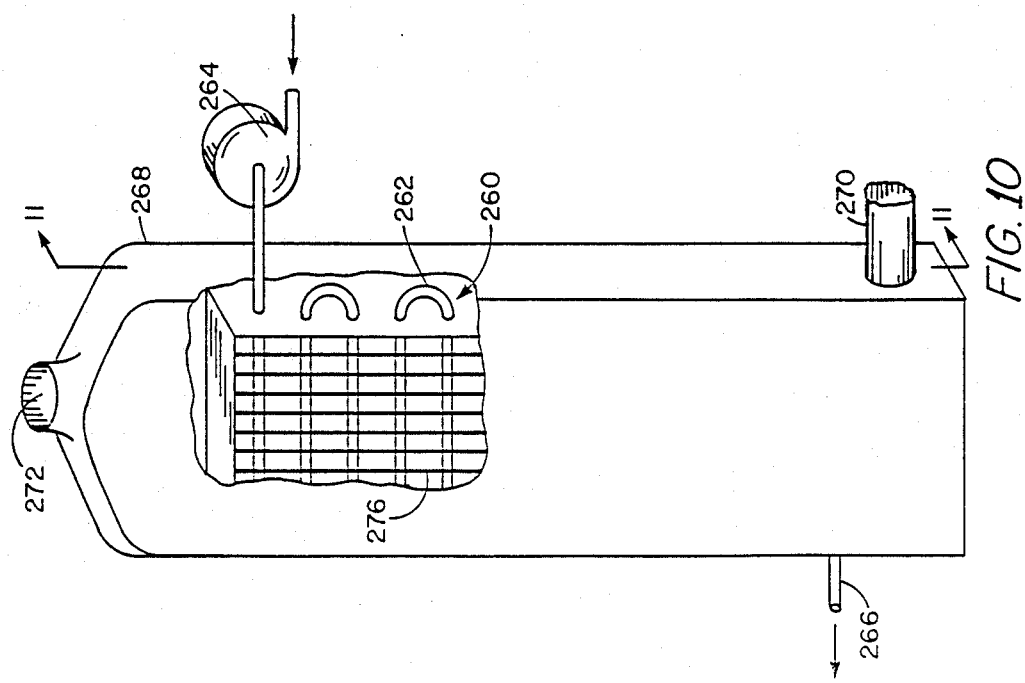
FIG. 10 is a partially broken away, right front perspective view of a recuperative heat exchanger embodiment for heating liquids.

A fourth alternate embodiment, for heating a liquid, is now described with particular reference to FIGS. 10 and 11. Recuperative heat exchanger 260 is shown having tubes 262 connected between inlet water pump 264 and outlet pipe 266. Enclosure 268, having inlet coupling 270 and flue opening 272, is shown enclosing water reservoir 274 and heat exchanger 260. Water reservoir 274 is positioned at the bottom of enclosure 268 adjacent to inlet 270. Inlet 270 is coupled to the exhaust from a nonrecuperative heat exchange process (not shown) such as, for example, a nonrecuperative heat exchanger.

Accordingly, combustion products from the nonrecuperative heat exchanger flow across reservoir 274 thereby beccomming elevated in dew point. Combustion products then flow across fins 276 of heat exchanger 260 into flue opening 272. The liquid forced through heat exchanger tubes 262 is heated by thermal transfer of sensible heat from the combustion products and by heat of condensation released by condensation forming on fins 276.

Condensate flows downwards along fins 276, opposite the flow of combustion products, into reservoir 274. The anti-corrosion advantages of the preferred embodiment are therefore applicable to this embodiment. Further, the low operating temperature of this embodiment enables the use of inexpensive acid resistant materials such as, for example, polypropylene for enclosure 268.

The liquid to be heated may be circulated through a secondary heat exchanger to heat air. The liquid may also be water for use as domestic hot water.

Although this embodiment is described as being coupled to a nonrecuperative heat exchanger, those skilled in the art will recognize that it may also be coupled to the exhaust of any apparatus which burns hydrocarbon fuels. It may also be coupled directly to a burner.

In conclusion, the embodiments described provide numerous advantages. Many anticorrosion advantages are obtained, as follows. Acidic condensate is continuously flushed. Ash and carbon residues are also flushed. Residual condensate is minimized in acidity. Heat transfer areas which dry out during the heating cycle, thereby increasing acid concentration, are substantially eliminated. A portion of potentially acid forming gases are pre-absorbed before entering the recuperative heat exchanger. The most acidic condensate is confined to the reservoir and structures which enclose the reservoir. Only those areas need be constructed of acid immune material. The operating temperature of the recuperative heat exchanger is reduced thereby reducing the rate of corrosive attack.

Noxious exhaust emissions are also reduced. A portion of noxious gases are absorbed in the water reservoir and recuperative heat exchanger. When a radiant burner is utilized, emission of nitrogen oxides are also minimized by lowering the temperature of burner output without sacrifice to efficiency.

In addition, the embodiments described may burn gaseous or liquid hydrocarbon fuels.

Although furnace 10 has been described with respect to specific details of certain preferred embodiments, it is not intended or required that such details limit the scope of the invention as set forth in the following claims. It will be apparent that various modifications and changes may be made by those skilled in the art without departing from the spirit of the invention as expressed in the accompanying claims. Hence, all matters shown and described are intended to be interpreted as illustrative and not in a limiting sense.

What is claimed is:

1. A method for heating a liquid, comprising the steps of:
    (a) providing a recuperative heat exchanger having a tube surrounded by fins;
    (b) circulating said liquid through said tube;
    (c) locating a water resevoir below said recuperative heat exchanger;
    (d) contacting hot combustion gases with said water in said resevoir for elevating the dew point and lowering the temperature of said hot combustion gases; and
    (e) directing said dew point elevated combustion gases upwardly across said recuperative heat exchanger, said dew point elevated combustion gases being provided at a given dew point and temperature where said liquid in said tube cools said combustion gases such that a substantial majority of the water vapor in said combustion gases condenses within said heat exchanger, wherein a steady-state cycle of condensation and evaporation is maintained where condensate flows back downward said fins into said resevoir at the same time said hot combustion gases reevaporate water in said resevoir for subsequent condensing in said heat exchanger.

* * * * *